(12) United States Patent
Hitomi et al.

(10) Patent No.: US 11,926,073 B2
(45) Date of Patent: Mar. 12, 2024

(54) METHODS FOR PRODUCING SHEET MOLDING COMPOUND AND FOR PRODUCING MOLDED PRODUCT

(71) Applicant: DIC Corporation, Tokyo (JP)

(72) Inventors: Kazutoshi Hitomi, Takaishi (JP); Yasuyuki Muranaka, Takaishi (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 17/776,451

(22) PCT Filed: Nov. 12, 2020

(86) PCT No.: PCT/JP2020/042177
§ 371 (c)(1),
(2) Date: May 12, 2022

(87) PCT Pub. No.: WO2021/106584
PCT Pub. Date: Jun. 3, 2021

(65) Prior Publication Data
US 2022/0402169 A1 Dec. 22, 2022

(30) Foreign Application Priority Data
Nov. 25, 2019 (JP) .................................. 2019-212311

(51) Int. Cl.
*C08J 5/24* (2006.01)
*B29B 11/16* (2006.01)
(Continued)

(52) U.S. Cl.
CPC ............... *B29B 11/16* (2013.01); *C08J 5/243* (2021.05); *B29C 70/465* (2013.01); (Continued)

(58) Field of Classification Search
CPC ...................................................... C08J 5/243
See application file for complete search history.

(56) References Cited

U.S. PATENT DOCUMENTS 6,901,986 B2 * 6/2005 Bradish .................. B32B 37/24
156/509
2019/0016088 A1 1/2019 Maeda et al.

FOREIGN PATENT DOCUMENTS

JP 2004-35714 A 2/2004
JP 6447791 B * 12/2018
(Continued)

OTHER PUBLICATIONS

Machine Translation of Japanese Patent 2019-39124, Date Unknown.*
Machine Translation of Japanese Patent 6447791, Date Unknown.*
Machine Translation of PCT WO 2019/017254, Date Unknown.*

*Primary Examiner* — Jeffry H Aftergut
(74) *Attorney, Agent, or Firm* — Locke Lord LLP; James E. Armstrong, IV; Nicholas J. DiCeglie, Jr.

(57) ABSTRACT

A method for producing a sheet molding compound including impregnating a resin composition into carbon fibers. The method is characterized in that the bulkiness $H_o$ of the carbon fibers before an impregnation step is 3 mm or more, the compression ratio $R_c(H_c/H_o)$ of the carbon fibers in the impregnation step is less than 1, the thickness of the sheet molding compound is 10 mm or less, and the content Wc of the carbon fibers is 40% by mass or more. The method for producing a sheet molding compound can produce a sheet molding compound having the excellent impregnation property into carbon fibers and thus can be preferably used for exteriors, structures, and the like of an automotive member, a railroad vehicle member, an aerospace vehicle member, a ship member, a housing equipment member, a sport member, a light vehicle member, a civil engineering and construction member, an OA equipment.

9 Claims, 1 Drawing Sheet

(51) Int. Cl.
  *B29C 70/46*     (2006.01)
  *B29K 105/00*    (2006.01)
  *B29K 105/08*    (2006.01)
  *B29K 307/04*    (2006.01)

(52) U.S. Cl.
  CPC ............... *B29K 2105/0094* (2013.01); *B29K 2105/0872* (2013.01); *B29K 2307/04* (2013.01); *C08J 2363/00* (2013.01)

(56) References Cited

FOREIGN PATENT DOCUMENTS

JP       2019-39124 A    *  3/2019
WO   WO-2019/017254 A1  *  1/2019

* cited by examiner

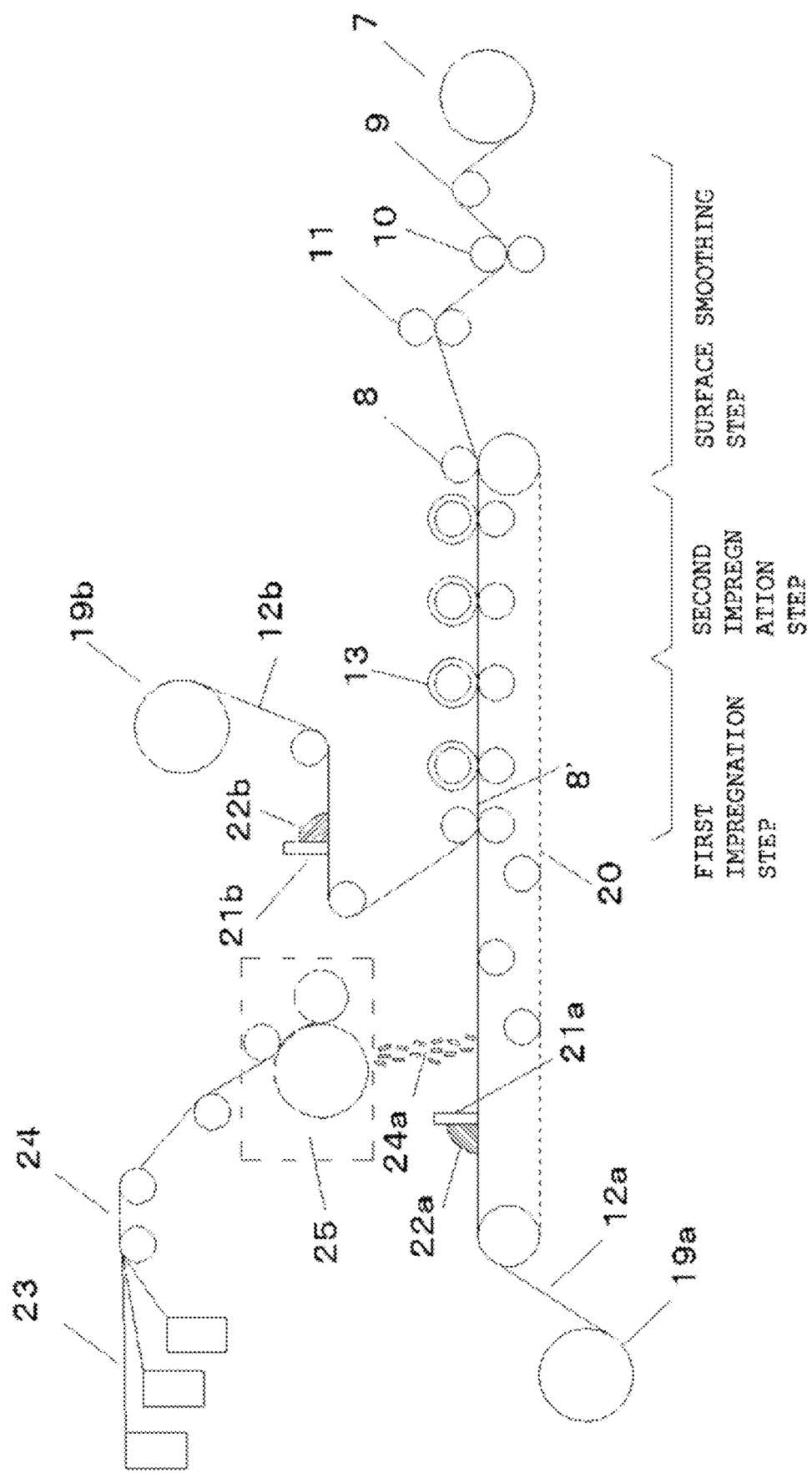

METHODS FOR PRODUCING SHEET MOLDING COMPOUND AND FOR PRODUCING MOLDED PRODUCT

TECHNICAL FIELD

The present invention relates to methods for producing a sheet molding compound and for producing a molded product.

BACKGROUND ART

The so-called FRP produced by reinforcing a thermosetting resin with a fiber reinforcing material is used in many fields such as industrial components, housing members, and automotive members. Further, a fiber-reinforced resin composite material produced by reinforcing a thermosetting resin, such as an epoxy resin, an unsaturated polyester resin, or the like, with carbon fibers serving as a fiber reinforcing material has a noticeable characteristic that it has excellent heat resistance and mechanical strength while being lightweight, and the use for various structural applications is expanded. In addition, a sheet molding compound (abbreviated as "SMC" hereinafter) is widely used because it uses discontinuous fibers as a fiber reinforcing material and thus, as compared with continuous fibers, has a wide application range of molded shapes and has productivity and a wide range of design applications due to the ability to reuse end materials and to insert different material members.

For the purpose of improving the appearance and strength of a molded product produced from such SMC, improvement in moldability and impregnation property of the SMC is examined (refer to, for example, Patent Literature 1). However, a method for producing SMC using a heated pressure roller has the problem of an unsatisfactory impregnation property in producing at a high resin viscosity and a high reinforcing fiber content.

CITATION LIST

Patent Literature

PTL 1: Japanese Unexamined Patent Application Publication No. 2004-35714

SUMMARY OF INVENTION

Technical Problem

A problem to be solved by the present invention is to provide a method for producing SMC having the excellent impregnation property into carbon fibers regardless of the carbon fiber content.

Solution to Problem

The inventors found that the problem can be solved by a method for producing SMC in which carbon fibers have specific bulkiness, compression ratio, and content, leading to the achievement of the present invention.

That is, the present invention relates to a method for producing a sheet molding compound including impregnating a resin composition into carbon fibers. The method for producing a sheet molding compound is characterized in that the bulkiness $H_o$ of the carbon fibers before an impregnation step is 3 mm or more, the compression ratio $R_c$ ($H_c/H_o$) of the carbon fibers in the impregnation step is less than 1, the thickness of the sheet molding compound is 10 mm or less, and the content Wc of the carbon fibers is 40% by mass or more (wherein $H_c$ is the bulkiness (mm) of the carbon fibers after the impregnation step, and $H_o$ is the bulkiness (mm) of the carbon fibers before the impregnation step).

Advantageous Effects of Invention

SMC and a molded product thereof produced by the present invention have the excellent impregnation property into carbon fibers and thus can be preferably used for exteriors, structures, and the like of an automotive member, a railroad vehicle member, an aerospace vehicle member, a ship member, a housing equipment member, a sport member, a light vehicle member, a civil engineering and construction member, an OA equipment, etc.

BRIEF DESCRIPTION OF DRAWING

FIG. 1 is a schematic drawing showing steps for producing SMC according to an embodiment of the present invention.

DESCRIPTION OF EMBODIMENTS

A method for producing SMC of the present invention is a method for producing a sheet molding compound, including impregnating a resin composition into carbon fibers, in which the bulkiness $H_o$ of the carbon fibers before an impregnation step is 3 mm or more, the compression ratio $R_c$ ($H_c/H_o$) of the carbon fibers in the impregnation step is less than 1, the thickness of the sheet molding compound is 10 mm or less, and the content Wc of the carbon fibers is 40% by mass or more (wherein $H_c$ is the bulkiness (mm) of the carbon fibers after the impregnation step, and $H_o$ is the bulkiness (mm) of the carbon fibers before the impregnation step).

A general method for producing SMC is, for example, a method including coating a resin composition on carrier films disposed on upper and lower sides so that the thickness becomes uniform (coating step), spraying a fiber reinforcing material on one of the resin composition-coated surfaces (addition step), inserting the reinforcing material between the resin compositions on the carrier films disposed on upper and lower sides and then passing the whole between impregnation rollers and applying pressure to impregnate the resin composition into the fiber reinforcing material (impregnation step), and then winding into a roll shape or folding zigzag. However, in the SMC producing method of the present invention, the compression ratio $R_c$ ($H_c/H_o$) of the carbon fibers in the impregnation step is less than 1, thereby causing the excellent impregnation property of the resin composition into the carbon fibers.

In addition, besides the method using the impregnation rollers, for example, a press system, a mesh belt system, and the like can be applied as an impregnation method.

The steps for producing SMC and a flow of a SMC sheet 8' are described with reference to FIG. 1. A thermoplastic resin film having a thickness of 10 to 50 μm and drawn out by an unwinding device 19a is placed as a lower carrier film 12a on a transfer belt 20, and a resin composition 22a is coated in a predetermined thickness on the lower carrier film by using a resin coating device 21a provided with a doctor blade or the like.

The resin composition 22a is coated so as to be located about 30 to 60 mm inside the width of the lower carrier film for preventing the coating width from projecting from both sides of the lower carrier film 12a. In addition, a guide roll of the transfer belt is properly disposed on the inside of the transfer belt 20.

A thermoplastic resin film such as a generally used polyethylene or polyethylene terephthalate film may be used as a material of the lower carrier film 12a, and a polypropylene film is preferably used.

The resin composition 22a is a paste-like material prepared by properly mixing a thermosetting resin as a main component, such as an epoxy resin, an unsaturated polyester resin, a vinyl ester resin, or the like, with a filler, a thickener such as a thermoplastic resin powder or the like, a curing catalyst, an internal release agent, a shrinkage-reducing agent, a coloring agent, and the like.

On the other hand, with respect to the carbon fibers impregnated with the resin composition 22a, for example, plural bundles of strands 24 are sent from roving 23 into a cutting device 25 and then scattered and deposited so as to be uniformly dispersed as carbon fiber cut pieces 24a of about 1/16 to 1.5 inches on the resin composition 22a.

Further, a thermoplastic resin film such as a polyethylene film having a thickness of 10 to 50 μm or the like is drawn out as an upper carrier film 12b by an unwinding device 19b, and the same resin composition 22b as the resin composition 22a is coated in a predetermined thickness on the upper carrier film by a resin coating device 21b provided with a doctor blade or the like, and is disposed on the carbon fiber cut pieces 24a so as to be in contact therewith. Also in this case, the resin composition 22b is coated so as to be located about 30 to 60 mm inside the upper carrier film 12b for preventing the coating width from projecting from both sides of the upper carrier film 12b.

The SMC sheet 8' obtained as described above has the layer configuration of the lower carrier film 12a/the resin composition 22a/the carbon fiber cut pieces 24a/the resin composition 22b/the upper carrier film 12b.

The thickness of a portion excluding both carrier films 12a and 12b is preferably 2.5 to 10 mm, and as shown in FIG. 1, preferably, the whole is sent to an impregnation device 13 in a subsequent step in which it is passed through plural impregnation rollers 13 having various surface groove shapes and defoamed while being impregnated with the resin composition 22a so that the carbon fiber cut pieces 24a are sufficiently wet, and further surface-smoothed, thereby producing the SMC sheet 8' of 10 mm or less.

The impregnation step preferably includes a first impregnation step and a second impregnation step so as to allow stepwise crushing because disturbance of the carbon fibers can be suppressed.

The first impregnation step is a step including crushing, to any desired thickness, the SMC sheet 8' having the layer configuration of the lower carrier film 12a/the resin composition 22a/the carbon fiber cut pieces 24a/the resin composition 22b/the upper carrier film 12b by adjusting the pressure and clearance of plural impregnation rollers having unevenness applied to the surfaces thereof. In this case, the resin composition is permeated between the carbon fibers according to the amount thereof while the carbon fibers are crushed. There occurs the fact the thickness is recovered immediately after crushing, but also in this case, permeation of the resin composition between the carbon fibers proceeds.

The second impregnation step is provided after the first impregnation step and includes further crushing the SMC sheet 8' crushed in the first impregnation step by adjusting the pressure and clearance of the plural impregnation rollers, producing the final SMC sheet. Like in the first impregnation step, the resin composition is permeated between the carbon fibers.

A surface smoothing step after the impregnation step includes smoothing the surface unevenness produced by the impregnation step by passing between two rollers having smooth surfaces, bringing into contact with a roller having a smooth surface, or passing between a roller having a smooth surface and a belt. In the case of passing between two rollers having smooth surfaces or passing between a roller having a smooth surface and a belt, the roller pushing pressure and clearance and the tension and speed of the SMC sheet in the flow direction thereof are adjusted. In the case of bringing into contact with a roller having a smooth surface, the tension and speed of the SMC sheet in the flow direction thereof are mainly adjusted.

In the SMC producing method of the present invention, the bulkiness $H_o$ of the carbon fibers before the impregnation step for the carbon fibers is 3 mm or more because of the excellent impregnation property, and $H_o$ is preferably 3.5 to 80 mm because the carbon fibers are most impregnated when crushed and decreased in thickness.

In the present invention, the bulkiness of the carbon fibers represents the height of a deposit of carbon fiber cut pieces, which is formed by scattering and depositing the carbon fiber cut pieces 24a on the resin composition on a carrier film. When the height of a deposit of the carbon fiber cut pieces cannot be directly measured, the thickness of the SMC sheet is measured, and the thickness of a portion excluding both carrier films 12a and 12b and the resin compositions 22a and 22b coated on the respective carrier films is determined.

In the present invention, each of the bulkiness of the fibers and the thickness of the SMC sheet is a value measured by a laser displacement sensor, the thickness of a resin film is a value measured by a soft X-ray-type film thickness measuring meter, and the thickness of a film is a value measured by a micrometer.

In the present invention, the bulkiness of the carbon fibers before the impregnation step is $H_o$, and the bulkiness of the carbon fibers after the impregnation step is $H_c$, but when there is a plurality of impregnation steps, the bulkiness after the first impregnation step is $H_{c1}$, and the bulkiness after the second impregnation step is $H_{c2}$, and among these, the lowest value is considered as the bulkiness $H_c$ of the carbon fibers after the impregnation step. In addition, the ratio of the bulkiness after the first impregnation step to the bulkiness before the impregnation step is referred to as the compression ratio $R_{c1}$ ($H_{c1}/H_o$), and the ratio of the bulkiness after the second impregnation step to the initial bulkiness is referred to as the compression ratio $R_{c2}$ ($H_{c2}/H_o$).

The bulkiness $H_{c1}$ of the carbon fibers after the first impregnation step is preferably 2.5 to 80 mm and preferably 2.5 to 60 mm.

In addition, the compression ratio $R_c$ ($H_c/H_o$) of the carbon fibers in the impregnation step is less than 1, but is preferably 0.003 to 0.9 because the carbon fibers are most impregnated when decreased in thickness by crushing.

Examples of the resin in the resin composition include thermosetting resins such as an epoxy resin, a vinyl ester resin, a vinyl urethane resin, an unsaturated polyester resin, a phenol resin, a melamine resin, a furan resin, and the like, and from the viewpoint of the mechanophysical properties such as strength after molding, an epoxy resin and a vinyl ester resin, and a vinyl urethane resin are more preferred. These resins can be used alone or in combination of two or more.

The resin composition can contain, as components other than the resin, for example, a diluent, a curing agent, a curing accelerator, a polymerization inhibitor, a filler, a low shrinkage agent, thermoplastic resin particles, a release agent, a thickener, a viscosity-reducing agent, a pigment, an antioxidant, a plasticizer, a flame retardant, an antibacterial agent, an ultraviolet stabilizer, a storage stabilizer, a reinforcing material, a photocuring agent, and the like.

Examples of the filler include an inorganic compound and an organic compound, and it can be used for adjusting the physical properties of a molded product, such as strength, elastic modulus, impact strength, fatigue durability, etc.

Examples of the inorganic compound include calcium carbonate, magnesium carbonate, barium sulfate, mica, talc, kaolin, clay, zeolite, asbestos, pearlite, baryta, silica, quartz sand, dolomite limestone, plaster, aluminum fine powder, hollow balloon, alumina, glass powder, aluminum hydroxide, whitish marble, zirconium oxide, antimony trioxide, titanium oxide, molybdenum dioxide, iron powder, and the like.

Examples of the organic compound include natural polysaccharide powders of cellulose, chitin, and the like; synthetic resin powders, and the like, and usable examples of the synthetic resin powders include an organic powder composed of a hard resin, a soft rubber, an elastomer, or a polymer (copolymer), and particles having a multilayer structure such as a core-shell type or the like. Specific examples thereof include particles composed of butadiene rubber and/or acrylic rubber, urethane rubber, silicone rubber, or the like, a polyimide resin powder, a fluorocarbon resin powder, a phenol resin powder, and the like. These fillers can be used alone or in combination of two or more.

Examples of the release agent include zinc stearate, calcium stearate, paraffin wax, polyethylene wax, Carnouba wax, a fluorine-based compound, and the like. A fluorine-based compound and paraffin wax are preferred. These release agents can be used alone or in combination of two or more.

Examples of the thickener include metal oxides and metal hydroxides such as magnesium oxide, magnesium hydroxide, calcium oxide, calcium hydroxide, and the like; acrylic resin-based fine particles; and the like, and it can be properly selected according to the handleability of a fiber-reinforced molding material of the present invention. These thickeners can be used alone or in combination of two or more.

The resin composition can be produced by mixing/dispersing the components described above by using a mixer such as a general mixer, an inter-mixer, a planetary mixer, a roll mill, a kneader, an extruder, or the like.

Because the outflow of the resin from the ends of the SMC sheet can be suppressed, the viscosity at 25° C. of the resin composition is preferably 800 mPa·s or more and more preferably 1000 to 40000 mPa·s. In addition, the viscosity is a value measured at 25° C. by using an E-type viscometer.

Because the heat resistance of a molded produce and the release property after pressure molding are more improved, the glass transition temperature (Tg) of the resin composition is 130° C. or more. The glass transition temperature (Tg) represents a value measured by DSC according to JISK7121-1987, and specifically represents a midpoint glass transition temperature (Tmg) read from a differential thermal curve which is observed when the resin composition is placed in a differential scanning calorimeter, heated from −50° C. to 250° C. under the heating condition of a heating rate of 10° C./min, maintained for 3 minutes, then rapidly cooled, and again measured from −50° C. to 250° C. under the heating condition of a heating rate of 10° C./min.

For example, fibers cut into a length of 2.5 to 50 mm are used as the carbon fibers, but fibers cut into 5 to 40 mm are more preferred because the in-mold fluidity during molding and the appearance and mechanophysical properties of a molded product are more improved.

Usable examples of the carbon fibers include various types such as a polyacrylonitrile type, a pitch type, a rayon type, and the like, and among these, the polyacrylonitrile type is preferred because high-strength carbon fibers can be easily obtained.

In addition, the number of filaments of fiber bundles used as the carbon fibers is preferably 1,000 to 60,000 because the resin impregnation property and the mechanophysical properties of a molded produce are more improved.

The content Wc of the carbon fibers in the components of the SMC of the present invention is 40% by mass or more, and is preferably within a range of 45% to 65% by mass and more preferably within a range of 45% to 60% by mass because the mechanophysical properties of the resultant molded product are more improved. With an excessively low content of the carbon fibers, a high-strength molded product is not obtained, while with an excessively high content of the fiber reinforcing material, swelling of the molded product possibly occurs due to the insufficient resin impregnation property into the carbon fibers, and thus the high-strength molded product is possibly not obtained.

In addition, the carbon fibers in the SMC of the present invention are preferably impregnated with the resin in a state where the fibers are in random directions.

A method for producing a molded product of the present invention is a method of molding the SMC produced by the production method described above, and a molding method is preferably heat compression molding from the viewpoint of excellent productivity and excellent design diversity.

A method for producing a molded product, used for the heat compression molding, for example, includes weighing a predetermined amount of the SMC, adding the SMC into a mold previously heated to 110° C. to 180° C., clamping the mold by a compression molding machine to shape the molding material, curing the molding material by holing a molding pressure of 0.1 to 30 MPa, and then taking out the resultant molded product. The specific molding conditions are preferably molding conditions in which a molding pressure of 1 to 20 MPa is held in the mold at a mold temperature of 120° C. to 160° C. for 1 to 5 minutes per mm of the thickness of the molded product, and are more preferably molding conditions in which because the productivity is more improved, a molding pressure of 1 to 20 MPa is held in the mold at a mold temperature of 140° C. to 160° C. for 1 to 3 minutes per mm of the thickness of the molded product.

The SMC of the present invention has excellent productivity and moldability, etc., and the resultant molded product can be preferably used for casings and the like of an automotive member, a railroad vehicle member, an aerospace vehicle member, a ship member, a housing equipment member, a sport member, a light vehicle member, a civil engineering and construction member, an OA equipment, etc.

EXAMPLES

The present invention is described in further detail below using examples, but the present invention is not limited to these examples. In addition, the viscosity is the viscosity at 25° C. measured by using an E-type viscometer (TV-22 manufactured by Toki Sangyo Co., Ltd.).

Example 1

A resin composition (1) was prepared by mixing, by three rollers, 40 parts by mass of epoxy resin (1) ("tetraglycidyl diaminodiphenylmethane" manufactured by Sigma Aldrich Co., LLT, epoxy equivalent: 110 to 130 g/eq, tetrafunctional aromatic epoxy resin), 40 parts by mass of epoxy resin (2) ("EPICLON 840LV" manufactured by DIC Corporation, bisphenol A-type, epoxy equivalent: 178 g/eq, number of functional groups: 2), 5 parts by mass of an epoxy diluent ("XY-622" manufactured by ANHUI XINYUAN Chemical Co., Ltd., 1,4-butanediol diglycidyl ether, epoxy equivalent: 131 g/eq, number of functional groups: 2), 15 parts by mass of an epoxy diluent ("EX-313" manufactured by Nagase & Co., Ltd., glycerol polyglycidyl ether, number of functional groups: 2 or more), 2 parts by mass of an internal release agent ("FB-962" manufactured by Daikin Industries, Ltd.), 8 parts by mass of an epoxy resin curing agent ("DICY7" manufactured by Mitsubishi Chemical Corporation, dicyandiamide), and 5 parts by mass of a curing accelerator ("B-605-IM" manufactured by DIC Corporation, alkylurea type), and also mixing 9 parts by mass of thermoplastic resin particles ("F303" manufactured by Aika Industry Co., Ltd., poly(meth)acrylate ester-based organic fine particles). The resin composition had a viscosity of 6480 mPa·s and a glass transition temperature (Tg) of 137.1° C.

[Formation of SMC]

The resin composition (1) prepared as described above was coated on a laminate film of polyethylene and polypropylene so that the coating amount was 860 g/m² on average, and carbon fibers (abbreviated as "carbon fibers (1)" hereinafter) produced by cutting a carbon fiber roving ("T700SC-12000-50C" manufactured by Toray Industries, Inc.) into 12.5 mm were uniformly dropped from the air on the laminate film so that the thickness was uniform without fiber directivity, and the carbon fiber content was 57% by mass. The carbon fibers were inserted between the laminate film and a film, on which the resin composition (1) had been coated similarly with the above method, to impregnate the carbon fibers (1) with the resin. In this case, the SMC sheet having a carbon fiber bulkiness of 4 mm was crushed to a carbon fiber bulkiness of 3 mm in the first impregnation step using impregnation rollers with the adjusted pressure and clearance, and further crushed to a carbon fiber bulkiness of 2 mm in the second impregnation step using impregnation rollers with the adjusted pressure and clearance. Then, the SMC sheet was allowed to stand at 80° C. for 2 hours, producing SMC (1). The basis weight of the SMC was 2 kg/m².

[Evaluation of Impregnation Property of SMC]

The SMC was divided into two portions at the middle line between a line parallel to the surface and a line parallel to the back as viewed from the cross-sectional direction of the SMC, exposing the inside of the SMC. Next, 30 carbon fiber bundles per 30 cm were randomly taken out from the bundles present in the surface of the exposed inside, and the masses thereof were measured, and an average value was calculated. This was repeated at 5 portions, and the fiber mass after impregnation was measured. The fiber mass after impregnation was compared with the unimpregnated fiber mass to evaluate the impregnation property according to criteria below. The unimpregnated fiber mass was determined by measuring the masses of 1000 carbon fibers cut into 12.5 mm and calculating an average. The mass was measured by using an analytical electronic balance GR-202 (manufactured by A & D Company, Limited, weighing unit: 0.01 mg).

5: The fiber mass after impregnation is increased by 40% or more as compared with the unimpregnated fiber mass.

4: The fiber mass after impregnation is increased by 20% or more and less than 40% as compared with the unimpregnated fiber mass.

3: The fiber mass after impregnation is increased by 10% or more and less than 20% as compared with the unimpregnated fiber mass.

2: The fiber mass after impregnation is increased by 3% or more and less than 10% as compared with the unimpregnated fiber mass.

1: The fiber mass after impregnation is increased by less than 3% as compared with the unimpregnated fiber mass or the outflow of only the resin from the ends of the SMC sheet is 30 mm or more.

[Formation of Molded Product]

The SMC (1) produced as described above was pressure-molded at a charge ratio of 75% to the projected area of a 30 cm-square mold under the molding conditions including a mold temperature of 140° C., a pressure time of 5 minutes, and an applied pressure of 10 MPa, thereby producing a molded product (1) having a sheet thickness of 2 mm.

[Evaluation of Impregnation Property of Molded Product]

A section of the molded product (1) produced as described above was observed with a magnification rate of 50 times by using digital microscope VHX-5000 (manufactured by Keyence Corporation) to evaluate the impregnation property according to criteria below. The observation was performed for sections (a total of two directions with a length of 300 mm) in two directions, any desired direction and a direction perpendicular thereto.

5: The number of unimpregnated portions is 2 or less.
4: The number of unimpregnated portions is 3 to 4 or less.
3: The number of unimpregnated portions is 5.
2: The number of unimpregnated portions is 6 to 10.
1: The number of unimpregnated portions is 11 or more.

Examples 2 to 6

SMC (2) to (6) and molded products (2) to (6) were produced by the same method as in Example 1 except that the pressure and clearance of the impregnation rollers in the first impregnation step and the pressure and clearance of the impregnation rollers in the second impregnation step were adjusted to provide impregnation conditions shown in Table 1, and each of the evaluations was performed.

TABLE 1

| | | Example 1 | Example 2 | Example 3 | Example 4 | Example 5 | Example 6 |
|---|---|---|---|---|---|---|---|
| Impregnation condition | Bulkiness of carbon fibers before impregnation step $H_0$ (mm) | 4 | 16 | 16 | 32 | 32 | 43 |

TABLE 1-continued

|  | Example 1 | Example 2 | Example 3 | Example 4 | Example 5 | Example 6 |
|---|---|---|---|---|---|---|
| Compression ratio $R_{C1}$ ($H_{C1}/H_0$) | 0.75 | 0.55 | 0.25 | 1 | 0.13 | 0.09 |
| Compression ratio $R_{C2}$ ($H_{C2}/H_0$) | 0.5 | 0.13 | 0.13 | 0.06 | 0.06 | 0.05 |
| Compression ratio $R_C$ ($H_C/H_0$) | 0.5 | 0.13 | 0.13 | 0.06 | 0.06 | 0.05 |
| Thickness of SMC (mm) | 2 | 2 | 2 | 2 | 2 | 2 |
| Impregnation property of SMC | 3 | 5 | 4 | 4 | 5 | 4 |
| Impregnation property of molded product | 5 | 5 | 5 | 5 | 5 | 5 |

Comparative Examples 1 and 2

SMC (R1) and (R2) and molded products (R1) and (R2) were produced by the same method as in Example 1 except that the pressure and clearance of the impregnation rollers in the first impregnation step and the pressure and clearance of the impregnation rollers in the second impregnation step were adjusted to provide impregnation conditions shown in Table 2, and each of the evaluations was performed.

TABLE 2

|  |  | Comparative Example 1 | Comparative Example 2 |
|---|---|---|---|
| Impregnation condition | Bulkiness of carbon fibers before impregnation step $H_0$ (mm) | 2.7 | 4 |
|  | Compression ratio $R_{C1}$ ($H_{C1}/H_0$) | 1 | 1 |
|  | Compression ratio $R_{C2}$ ($H_{C2}/H_0$) | 0.93 | 1 |
|  | Compression ratio $R_C$ ($H_C/H_0$) | 0.93 | 1 |
| Thickness of SMC (mm) |  | 2.5 | 4 |
| Impregnation property of SMC |  | 1 | 1 |
| Impregnation property of molded product |  | 2 | 2 |

It was confirmed that the SMC and molded products produced by the production method of the present invention in Examples 1 to 6 are excellent in impregnation property.

On the other hand, Comparative Example 1 is an example in which the initial bulkiness of the carbon fibers is lower than 3 mm as the lower limit of the present invention, and it was confirmed that the impregnation property is unsatisfactory.

Comparative Example 2 is an example in which the compression ratio Rc is 1, and it was confirmed that the impregnation property is unsatisfactory.

REFERENCE SIGNS LIST

7 SMC sheet roll
8, 9, 10, 11 planar roller
8' SMC sheet
12 carrier film
13 impregnation roller
19 unwinding device
20 transfer belt
21 resin coating device
22 resin paste
23 roving
24 strand
25 cutting device

The invention claimed is:

1. A method for producing a sheet molding compound, comprising impregnating a resin composition into carbon fibers, wherein the bulkiness Ho of the carbon fibers before an impregnation step, as measured by a laser displacement sensor, is 3 mm or more, the compression ratio Rc (Hc/Ho) of the carbon fibers in the impregnation step is 0.003 to 0.75, the thickness of the sheet molding compound is 10 mm or less, and the content Wc of the carbon fibers is 40% by mass or more, wherein Hc is the bulkiness (mm) of the carbon fibers after the impregnation step, and Ho is the bulkiness (mm) of the carbon fibers before the impregnation step.

2. The method for producing a sheet molding compound according to claim 1, wherein the viscosity of the resin composition is 800 mPa·s or more.

3. The method for producing a sheet molding compound according to claim 1, wherein the glass transition temperature (Tg) of the resin composition is 130° C. or more.

4. A method for producing a molded product, comprising molding the sheet molding compound produced by the production method according to claim 1.

5. The method for producing a sheet molding compound according to claim 2, wherein the glass transition temperature (Tg) of the resin composition is 130° C. or more.

6. A method for producing a molded product, comprising molding the sheet molding compound produced by the production method according to claim 2.

7. A method for producing a molded product, comprising molding the sheet molding compound produced by the production method according to claim 3.

8. A method for producing a molded product, comprising molding the sheet molding compound produced by the production method according to claim 5.

9. The method for producing a sheet molding compound according to claim 1, wherein the compression ratio $R_c$ ($H_c/H_o$) of the carbon fibers in the impregnation step is 0.003 to 0.5.

* * * * *